United States Patent
Zhao et al.

(10) Patent No.: US 10,827,512 B2
(45) Date of Patent: Nov. 3, 2020

(54) DATA DETECTION METHOD AND TERMINAL

(71) Applicant: CHINA ACADEMY OF TELECOMMUNICATIONS TECHNOLOGY, Beijing (CN)

(72) Inventors: Rui Zhao, Beijing (CN); Ying Peng, Beijing (CN); Li Zhao, Beijing (CN); Jiayi Fang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 16/480,841

(22) PCT Filed: Feb. 28, 2018

(86) PCT No.: PCT/CN2018/077530
§ 371 (c)(1),
(2) Date: Jul. 25, 2019

(87) PCT Pub. No.: WO2018/137719
PCT Pub. Date: Aug. 2, 2018

(65) Prior Publication Data
US 2020/0037339 A1     Jan. 30, 2020

(30) Foreign Application Priority Data
Jan. 25, 2017 (CN) .......................... 2017 1 0056353

(51) Int. Cl.
*H04W 72/12* (2009.01)
*H04W 4/46* (2018.01)
(Continued)

(52) U.S. Cl.
CPC ... *H04W 72/1242* (2013.01); *H04W 72/1278* (2013.01); *H04W 4/46* (2018.02)

(58) Field of Classification Search
None
See application file for complete search history.

(56) References Cited

U.S. PATENT DOCUMENTS 10,039,119 B2 * 7/2018 Sorrentino ........ H04W 74/0808
10,334,648 B2 * 6/2019 Kim .................. H04L 12/46
(Continued)

FOREIGN PATENT DOCUMENTS

| CN | 105955814 A | 9/2016 |
| CN | 106332284 A | 1/2017 |

(Continued)

OTHER PUBLICATIONS

Written Opinion dated Apr. 9, 2018 for International Application No. PCT/CN2018/077530.
(Continued)

*Primary Examiner* — Hong S Cho
(74) *Attorney, Agent, or Firm* — Harness, Dickey and Pierce, P.L.C.

(57) ABSTRACT

A data detection method and a terminal applied to a first terminal are provided. The method includes receiving one or more pieces of SA information transmitted by one or more second terminals and used to indicate transmission resources of one or more data-to-be-detected; determining, based on the one or more pieces of SA information, one or more detection weight values corresponding to the one or more data-to-be-detected; detecting, based on the one or more detection weight values, the one or more data-to-be-detected within a data detection capability of the first terminal.

20 Claims, 5 Drawing Sheets

(51) Int. Cl.
*H04W 8/22* (2009.01)
*H04L 5/00* (2006.01)
*H04L 1/00* (2006.01)

(56) References Cited

U.S. PATENT DOCUMENTS

2017/0041942 A1\* 2/2017 Wallentin .......... H04W 72/1289
2018/0220481 A1 8/2018 Seo et al.

FOREIGN PATENT DOCUMENTS

WO WO-2016022849 A1 2/2016
WO WO-2017003156 A1 1/2017

OTHER PUBLICATIONS

International Preliminary Report on Patentability for International Application No. PCT/CN2018/077530 dated Aug. 8, 2019.
International Preliminary Report on Patentability for International Application No. PCT/CN2018/075813 dated Aug. 8, 2019.

\* cited by examiner

DATA DETECTION METHOD AND TERMINAL

CROSS-REFERENCE TO RELATED APPLICATIONS

This application is a U.S. national phase application of a PCT Application No. PCT/CN2018/077530 filed on Feb. 28, 2018, which claims a priority to a Chinese Patent Application No. 201710056353.7 filed in China on Jan. 25, 2017, the disclosure of which is incorporated herein by reference in its entirety.

TECHNICAL FIELD

The present disclosure relates to the field of communication technology, and more particularly, relates to a data detection method and a terminal.

BACKGROUND

During direct communication (Vehicle to Vehicle Communication (V2V communication)) among vehicles based on a PC-5 interface in a Long Term Evolution (LTE) system, a user obtains, based on Scheduling Assignment (SA) information received by the user, an indication for resources occupied by data transmission and obtains information such as a Modulation and Coding Scheme, so as to perform detection to data corresponding to the data transmission.

During the detection, a terminal (such as a User Equipment (UE)) detects the SA and if the SA is received, the terminal further performs the detection to the data corresponding to the data transmission based on the received SA. A processing capability of the UE is limited. For example, when the UE performs the SA detection, a maximum quantity of channel resources available for transmitting the SA and capable of being blindly detected in a subframe needs to be defined; and a maximum quantity of physical resource blocks (PRBs) detectable by the UE when the UE receives the data needs to be defined. Specifically, the processing capability of the UE, such as the maximum quantity X of channel resources in which the SA may be blindly detected, and a quantity Y of PRBs capable of being detected by the UE when the UE detects the data, needs to be defined in a communication system.

At present, a LTE-based V2V technology is determined to be improved by using D2D (Device to Device) direct communication based on the LTE. SA information and data information (Data) are transmitted through different channels. A receiving end first detects and receives the SA information carried in a control channel, and then receives the data information based on the received SA information. In the LTE-based V2V technology, there are two resource selection modes, one of the two resource selection modes is a resource selection mode in which the UE autonomously performs resource selection, as shown in FIG. 1, and the other of the two resource selection modes is a resource selection mode in which a base station assists in the resource selection, as shown in FIG. 2. When a vehicle is within a coverage range of a network, the base station may schedules the V2V communication through a Physical Downlink Control Channel (PDCCH) or an Enhanced Physical Downlink Control Channel (EPDCCH). The base station indicates the vehicle to transmit the SA information and information about locations of resources occupied by the data by transmitting a V2V grant message to the vehicle.

Further, in the V2V in a LTE Rel-14, the SA information and data associated with the SA information of the same user are transmitted in the same subframe, and two types of frequency division multiplexing (FDM) transmission modes for the SA information and data are given. One of the two types is an adjacent-frequency transmission mode, as shown in FIG. 3; and in the adjacent-frequency transmission mode, SA information transmitted in a SA channel may schedule data channels across multiple sub-channels, wherein a SA channel between two data channels may be used to transmit the data information. The other of the two types is non-adjacent-frequency transmission mode, as shown in FIG. 4. In the non-adjacent frequency transmission mode, a SA channel is not adjacent to a data channel corresponding to the SA channel, that is, the SA channel and the data channel are configured separately, wherein the SA channel has a one-to-one correspondence with a sub-channel position occupied by the data.

When the number of channel resources of the SA needs to be detected by the terminal or the number of PRBs received by the terminal exceeds a processing capability of the terminal, a clear processing strategy is required. For example, during the direct communication among vehicle, resources allocated by different terminals may overlap since the terminals may adopt an autonomous method for allocating resources. Thus, the total number of PRBs needing to be received may exceed the maximum processing capability of the terminal. As shown in FIG. 5, configuration of a resource pool (resource locations of the SA channel, and data channels occupied by each terminal) is shown, and the number of detectable PRBs supported by the terminal may cover a full bandwidth $Y_{band}$, wherein, transmission for a UE1 may occupy the full bandwidth $Y_1=Y_{band}$, transmissions for a UE2 and a UE3 may occupy one sub-channel $Y_2$ and $Y_3$ only; if a terminal receives SAs from UE1, UE2 and UE3, then the terminal needs to detect resources of UE1, UE2 and UE3, respectively, that is, the number of PRBs needing to be detected is $Y_{all}=Y_1+Y_2+Y_3$, which exceeds the maximum data detection capability of the terminal in such a case.

Therefore, in a V2V communication system, when the terminal adopts the autonomous method for allocating resources and determines based on the SA received by the terminal that the number of PRB s needing to be detected exceeds the data detection capability of the terminal, a reasonable detection strategy may not be determined and important data may be lost.

SUMMARY

The present disclosure provides a data detection method and a terminal. A problem in a related V2V communication system that if data-to-be-detected exceed the maximum data detection capability of the terminal, important data is lost due to incapability of determining a rule of discarding data is addressed.

Some embodiments of the present disclosure provide a data detection method. The method is applied to a first terminal and includes receiving one or more pieces of scheduling allocation (SA) information transmitted by one or more second terminals and used to indicate transmission resources of one or more data-to-be-detected; determining, based on the one or more pieces of SA information, one or more detection weight values corresponding to the one or more data-to-be-detected; detecting, based on the one or more detection weight values, the one or more data-to-be-detected within a data detection capability of the first terminal.

Optionally, the receiving SA information transmitted by the one or more second terminals and used to indicate the transmission resources of the one or more data-to-be-detected, includes: detecting, through blind detection, the one or more pieces of SA information transmitted by the one or more second terminals within predefined SA channel resources and used to indicate the transmission resources of the one or more data-to-be-detected, wherein the predefined SA channel resources are pre-configured based on a minimum of SA blind detection capabilities of the first terminal and the one or more second terminals, and/or, the predefined SA channel resources are configured by a base station based on the minimum of the SA blind detection capabilities of the first terminal and the one or more second terminals.

Optionally, the determining, based on the one or more pieces of SA information, the one or more detection weight values corresponding to the one or more data-to-be-detected, includes: determining the one or more detection weight values corresponding to the one or more data-to-be-detected based on at least one of following (a), (b), (c) or (d): (a) one or more pieces of priority information of the one or more data-to-be-detected included in the one or more pieces of SA information, (b) one or more pieces of transmission type information of the one or more data-to-be-detected included in the one or more pieces of SA information, (c) one or more signal reception power values corresponding to the one or more pieces of SA information, or (d) one or more signal reception power values corresponding to the one or more data-to-be-detected indicated in the one or more pieces of SA information.

Optionally, in a case that the one or more pieces of SA information include the one or more pieces of priority information of the one or more data-to-be-detected, the determining, based on the one or more pieces of SA information, the one or more detection weight values corresponding to the one or more data-to-be-detected, includes: determining the one or more detection weight values corresponding to the one or more data-to-be-detected based on the one or more pieces of priority information of the one or more data-to-be-detected, wherein the higher a priority level of one of the one or more data-to-be-detected indicated by one of the one or more pieces of priority information is, the higher a detection weight value of the one or more detection weight values corresponding to the priority level is.

Optionally, in a case that the one or more pieces of SA information include the one or more pieces of transmission type information of the one or more data-to-be-detected, the determining, based on the one or more pieces of SA information, the one or more detection weight values corresponding to the one or more data-to-be-detected, includes: determining the one or more detection weight values corresponding to the one or more data-to-be-detected based on the one or more pieces of transmission type information of the one or more data-to-be-detected, wherein a transmission type indicated by the one or more pieces of transmission type information includes initial transmission and retransmission, and a detection weight value corresponding to one of the one or more data-to-be-detected which is retransmitted after the initial transmission of the one of the one or more data-to-be-detected fails is larger than a detection weight value of another one of the one or more data-to-be-detected initially transmitted.

Optionally, the determining, based on the one or more pieces of SA information, the one or more detection weight values corresponding to the one or more data-to-be-detected, includes: determining the one or more detection weight values corresponding to the one or more data-to-be-detected based on one or more reference signal reception powers (RSRPs) of one or more demodulation reference signals (DMRSs) corresponding to the one or more pieces of SA information, wherein if a first RSRP of the one or more RSRPs of the DMRSs corresponding to the one or more pieces of SA information is larger than a second RSRP of the one or more RSRPs of the DMRSs corresponding to the one or more pieces of SA information, then a detection weight value corresponding to the first RSRP in the one or more detection weight values corresponding to the one or more data-to-be-detected is larger than a detection weight value corresponding to the second RSRP in the one or more detection weight values corresponding to the one or more data-to-be-detected.

Optionally, the determining, based on the one or more pieces of SA information, the one or more detection weight values corresponding to the one or more data-to-be-detected, includes: determining the one or more detection weight values corresponding to the one or more data-to-be-detected based on one or more signal reception power values of one or more demodulation reference signals (DMRSs) corresponding to one or more the data-to-be-detected indicated by the one or more pieces of SA information, wherein if a first signal reception power value of the one or more signal reception power values of the one or more DMRSs corresponding to the one or more data-to-be-detected indicated by the one or more pieces of SA information is larger than a second signal reception power value of the one or more signal reception power values of the one or more DMRSs corresponding to the one or more data-to-be-detected indicated by the one or more pieces of SA information, then a detection weight value corresponding to the first signal reception power value in the one or more detection weight values corresponding to the one or more data-to-be-detected is larger than a detection weight value corresponding to the second signal reception power value in the one or more detection weight values corresponding to the one or more data-to-be-detected.

Optionally, the one or more signal reception power values of the one or more DMRSs corresponding to the one or more data-to-be-detected indicated by the one or more pieces of SA information includes: the one or more RSRPs of the one or more DMRSs corresponding to the one or more data-to-be-detected, or one or more total signal reception powers of the one or more DMRSs corresponding to the one or more data-to-be-detected.

Optionally, detecting, based on the one or more detection weight values, the one or more data-to-be-detected within the data detection capability of the first terminal, includes: filtering the one or more data-to-be-detected based on one or more the detection weight values within the data detection capability of the first terminal; detecting the filtered data-to-be-detected.

Optionally, filtering the one or more data-to-be-detected based on the one or more detection weight values within the data detection capability of the first terminal, includes: sorting the one or more detection weight values in a descending order to obtain a detection weight value sequence; extracting sequentially corresponding data-to-be-detected from the detection weight value sequence; determining whether a cumulative detection capability required for detecting the extracted data-to-be-detected exceeds a maximum data detection capability of the first terminal or not; if the cumulative detection capability required for detecting the extracted data-to-be-detected does not exceed the maximum data detection capability of the first terminal, continuing to extract next data-to-be-detected from the detection weight value sequence until the cumulative detection capability required for detecting the extracted data-to-be-detected reaches the maximum data detection capability of the first terminal; if the cumulative detection capability required for detecting the extracted data-to-be-detected exceeds the maximum data detection capability of the first terminal, removing a datum-to-be-detected having a lowest detection weight value from the extracted data-to-be-detected, continuing to extract next data-to-be-detected from the detection weight value sequence until the cumulative detection capability required for detecting the extracted data-to-be-detected reaches the maximum data detection capability of the first terminal.

In another aspect of the present disclosure, a terminal applied to a first terminal is provided and includes: a reception module, configured to receive one or more pieces of scheduling allocation (SA) information transmitted by one or more second terminals and used to indicate transmission resources of one or more data-to-be-detected; a processing module, configured to determine, based on the one or more pieces of SA information, one or more detection weight values corresponding to the one or more data-to-be-detected; a detection module, configured to detect, based on the one or more detection weight values, the one or more data-to-be-detected within a data detection capability of the first terminal.

Optionally, the reception module includes: a first detection unit, configured to detect, through blind detection, the one or more pieces of SA information transmitted by the one or more second terminals within predefined SA channel resources and used to indicate the transmission resources of the one or more data-to-be-detected, wherein the predefined SA channel resources are pre-configured based on a minimum of SA blind detection capabilities of the first terminal and the one or more second terminals, and/or, the predefined SA channel resources are configured by a base station based on the minimum of the SA blind detection capabilities of the first terminal and the one or more second terminals.

Optionally, the processing module includes: a processing unit, configured to determine the one or more detection weight values corresponding to the one or more data-to-be-detected based on at least one of following (a), (b), (c) or (d): (a) one or more pieces of priority information of the one or more data-to-be-detected included in the one or more pieces of SA information, (b) one or more pieces of transmission type information of the one or more data-to-be-detected included in the one or more pieces of SA information, (c) one or more signal reception power values corresponding to the one or more pieces of SA information, or (d) one or more signal reception power values corresponding to the one or more data-to-be-detected indicated in the one or more pieces of SA information.

Optionally, in a case that the one or more pieces of SA information include the one or more pieces of priority information of the one or more data-to-be-detected, the processing unit includes a first processing sub-unit, the first processing sub-unit is configured to determine the one or more detection weight values corresponding to the one or more data-to-be-detected based on the one or more pieces of priority information of the one or more data-to-be-detected, wherein the higher a priority level of one of the one or more data-to-be-detected indicated by one of the one or more pieces of priority information is, the higher a detection weight value of the one or more detection weight values corresponding to the priority level is.

Optionally, in a case that the one or more pieces of SA information include the one or more pieces of transmission type information of the one or more data-to-be-detected, the processing unit includes a second processing sub-unit, the second processing sub-unit is configured to determine the one or more detection weight values corresponding to the one or more data-to-be-detected based on the one or more pieces of transmission type information of the one or more data-to-be-detected, wherein a transmission type indicated by the one or more pieces of transmission type information includes initial transmission and retransmission, and a detection weight value corresponding to one of the one or more data-to-be-detected which is retransmitted after the initial transmission of the one of the one or more data-to-be-detected fails is larger than a detection weight value of another one of the one or more data-to-be-detected initially transmitted.

Optionally, the processing unit further includes: a third processing sub-unit, configured to determine the one or more detection weight values corresponding to the one or more data-to-be-detected based on one or more reference signal reception power (RSRP) values of one or more demodulation reference signals (DMRSs) corresponding to the one or more pieces of SA information, wherein if a first RSRP of the one or more RSRPs of the DMRSs corresponding to the one or more pieces of SA information is larger than a second RSRP of the one or more RSRPs of the DMRSs corresponding to the one or more pieces of SA information, then a detection weight value corresponding to the first RSRP in the one or more detection weight values corresponding to the one or more data-to-be-detected is larger than a detection weight value corresponding to the second RSRP in the one or more detection weight values corresponding to the one or more data-to-be-detected.

Optionally, the processing unit further includes: a fourth processing sub-unit, configured to determine the one or more detection weight values corresponding to the one or more data-to-be-detected based on one or more signal reception power values of one or more demodulation reference signals (DMRSs) corresponding to one or more the data-to-be-detected indicated by the one or more pieces of SA information, wherein if a first signal reception power value of the one or more signal reception power values of the one or more DMRSs corresponding to the one or more data-to-be-detected indicated by the one or more pieces of SA information is larger than a second signal reception power value of the one or more signal reception power values of the one or more DMRSs corresponding to the one or more data-to-be-detected indicated by the one or more pieces of SA information, then a detection weight value corresponding to the first signal reception power value in the one or more detection weight values corresponding to the one or more data-to-be-detected is larger than a detection weight value corresponding to the second signal reception power value in the one or more detection weight values corresponding to the one or more data-to-be-detected.

Optionally, the one or more signal reception power values of the one or more DMRSs corresponding to the one or more data-to-be-detected indicated by the one or more pieces of SA information includes: the one or more RSRPs of the one or more DMRSs corresponding to the one or more data-to-be-detected, or one or more total signal reception powers of the one or more DMRSs corresponding to the one or more data-to-be-detected.

Optionally, the detection module includes: a filtering unit, configured to filter the one or more data-to-be-detected based on one or more the detection weight values within the data detection capability of the first terminal; a second detection unit, configured to detect the filtered data-to-be-detected.

Optionally, the filtering unit includes: a sorting sub-unit, configured to sort the one or more detection weight values in a descending order to obtain a detection weight value sequence; an extracting sub-unit, configured to extract sequentially corresponding data-to-be-detected from the detection weight value sequence; a determination sub-unit, configured to determine whether a cumulative detection capability required for detecting the extracted data-to-be-detected exceeds a maximum data detection capability of the first terminal or not; a first filtering sub-unit, configured to if the cumulative detection capability required for detecting the extracted data-to-be-detected does not exceed the maximum data detection capability of the first terminal, continue to extract next data-to-be-detected from the detection weight value sequence until the cumulative detection capability required for detecting the extracted data-to-be-detected reaches the maximum data detection capability of the first terminal; a second filtering sub-unit, configured to, if the cumulative detection capability required for detecting the extracted data-to-be-detected exceeds the maximum data detection capability of the first terminal, remove a datum-to-be-detected having a lowest detection weight value from the extracted data-to-be-detected, continue to extract next data-to-be-detected from the detection weight value sequence until the cumulative detection capability required for detecting the extracted data-to-be-detected reaches the maximum data detection capability of the first terminal.

In still another aspect of the present disclosure, a terminal is provided, and includes a processor, a storage, configured to store programs and data used by the processor when the processor performs operations, and a transceiver, configured to transmit data and receive data, wherein, when the processor invokes and executes the programs and the data stored in the storage, the processor performs following steps: receiving, by the transceiver under a control of the processor, one or more pieces of scheduling allocation (SA) information transmitted by one or more second terminals and used to indicate transmission resources of one or more data-to-be-detected; determining, by the processor, based on the one or more pieces of SA information, one or more detection weight values corresponding to the one or more data-to-be-detected; detecting, based on the one or more detection weight values by the processor, the one or more data-to-be-detected within a data detection capability of the first terminal.

An advantageous effect of the above technical solutions of the present disclosure is as follows. The first terminal determines the detection weight values corresponding to the data-to-be-detected based on the detected SA information, and further continues to filter the data-to-be-detected based on the detection weight values, so that important data are preferentially detected within the data detection capability of the first terminal and the problem that important data may be lost due to incapability of determining a rule of discarding data when data-to-be-detected exceeds the maximum data detection capability of the terminal is avoided.

DETAILED DESCRIPTION

In order to make technical problems, technical solutions and advantages to be solved by the present disclosure clearer, detailed description will be provided hereinafter with reference to accompanying drawings and specific embodiments. In the following description, specific details such as specific configurations and components are provided merely for sake of facilitating a thorough understanding of embodiments of the present disclosure. Accordingly, it will be apparent to those skilled in the art that various changes and modifications may be made to the embodiments described herein without departing from the scope and the spirit of the present disclosure. In addition, for purpose of clarity and brevity, description of known functions and configurations are omitted.

It should be understood that references to 'one embodiment' or 'an embodiment' throughout the specification mean that particular features, structures, or characteristics related to the embodiments are included in at least one embodiment of the present disclosure. Thus, 'in one embodiment' or 'in an embodiment' appearing throughout the specification does not necessarily refer to the same embodiment. Furthermore, these particular features, structures, or characteristics may be combined in one or more embodiments in any suitable manner.

In various embodiments of the present disclosure, it should be understood that t sizes of sequence numbers of each process described below does not mean an execution order, and the execution order of each process should be determined by function and internal logic in the process, without acting as a limitation to the embodiments of the present disclosure.

In addition, terms 'system' and 'network' are used interchangeably herein.

In the embodiments provided herein, it should be understood that 'B corresponding to A' means that B is associated with A, and B may be determined based on A. However, it should also be understood that that determination of B based on A does not mean that B is only determined based on A, but may also be determined based on A and/or based on other information.

In particular, the embodiments of the present disclosure provide a data detection method. The data detection method addresses problems in the related that, the V2V communication system, when data-to-be-detected exceeds the maximum data detection capability of the terminal, important data may be lost due to incapability of determining a rule of discarding data.

Figure 1:
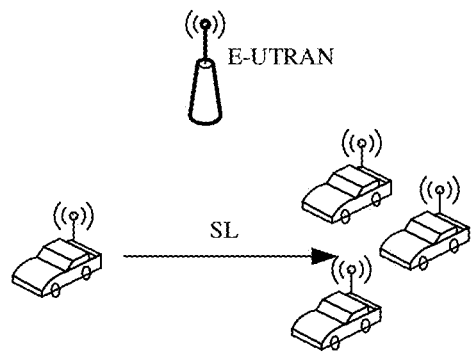
FIG. 1 is a diagram showing an architecture of a V2V system in which a terminal autonomously performs resource selection.
Figure 2:
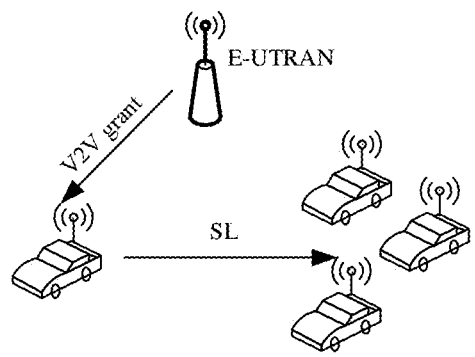
FIG. 2 is a diagram showing an architecture of a V2V system in which a base station assists the resource selection.
Figure 3:
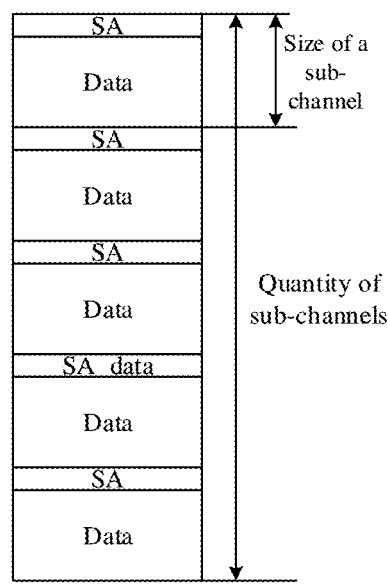
FIG. 3 shows a diagram of resource pool configuration for an adjacent-frequency transmission mode.
Figure 4:
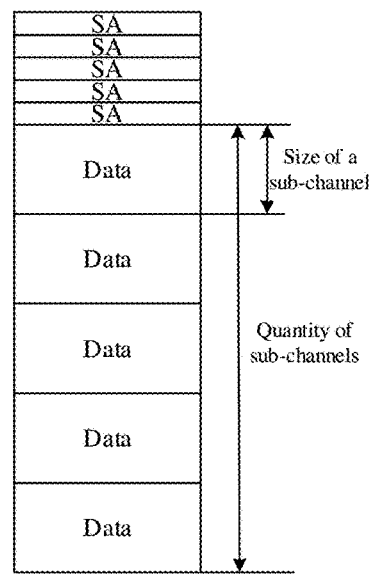
FIG. 4 shows a diagram of resource pool configuration for a non-adjacent frequency transmission mode.
Figure 5:
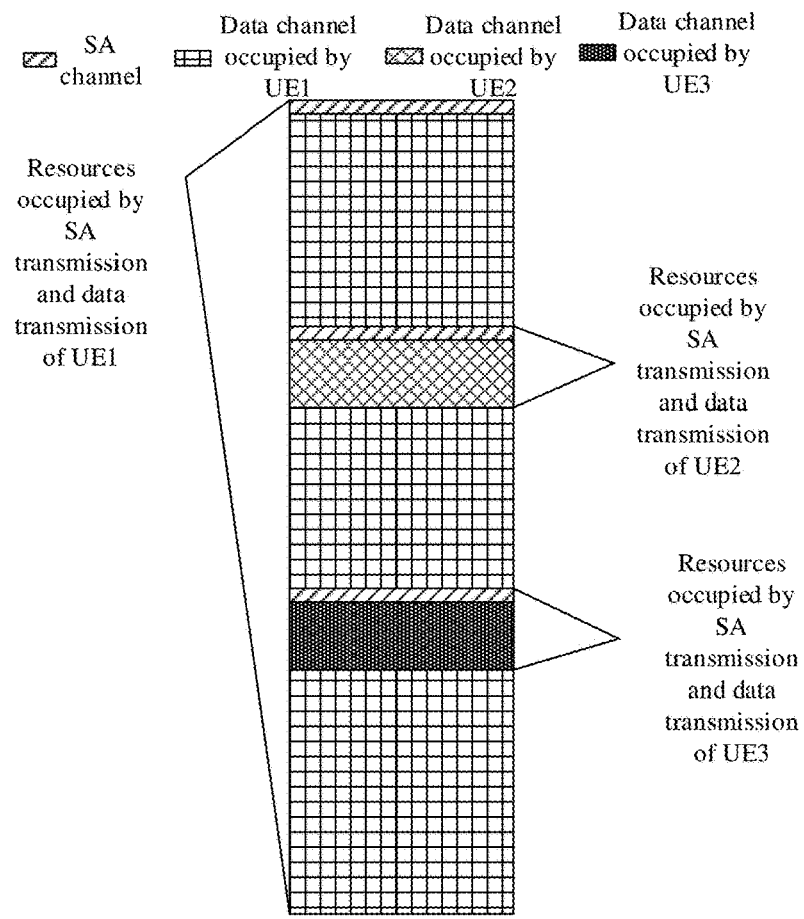
FIG. 5 shows a diagram of resource pool configuration in the relevant art.
Figure 6:
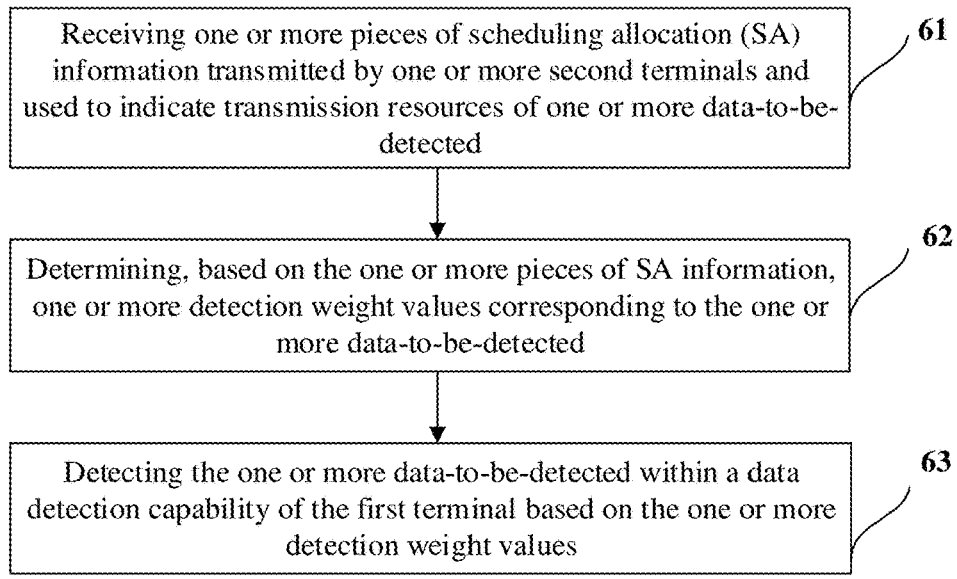
FIG. 6 illustrates a flow chart of a data detection method in some embodiments of the present disclosure.

In some optional embodiments, as shown in FIG. 6, the embodiments of the present disclosure provide a data detection method. Specifically, the data detection method includes the following steps 61-63.

Step 61: receiving one or more pieces of scheduling allocation (SA) information transmitted by one or more second terminals and used to indicate transmission resources of one or more data-to-be-detected.

The one or more second terminals are terminals maintaining one or more wireless communication links with a first terminal. Specifically, the first terminal is a first vehicle, and the one or more second terminals are one or more second vehicles within a predefined range from the first vehicle. It should be noted that the first terminal and the one or more second terminals are completely identical terminals, and this embodiment is described by only taking the first terminal as a receiving end, and a receiving process of each of the one or more second terminals may also adopt an implementation mode provided in the embodiment of the present disclosure. Furthermore, the one or more second terminals are a collection of a class of terminals, rather than particular terminals, and the number of the one or more second terminals is dependent on a location and an environment in which the first terminal is located. Here, the step 61 refers to that the first terminal receives the one or more pieces of SA information transmitted by the one or more second terminals, wherein the one or more pieces of SA information are used to indicate transmission resources corresponding to one or more pieces of data information transmitted by the one or more second terminals.

Step 62: determining, based on the one or more pieces of SA information, one or more detection weight values corresponding to the one or more data-to-be-detected.

The one or more pieces of SA information are used to indicate the transmission resources corresponding to the one or more data transmissions. After the first terminal receives and parses the one or more pieces of SA information transmitted by the one or more second terminals, the first terminal determines, for one or more data-to-be-detected, one or more detection weight values associated with the one or more pieces of SA information. Different pieces of SA information correspond to different detection weight values of one or more data-to-be-detected.

Step 63: detecting, based on the one or more detection weight values, the one or more data-to-be-detected within a data detection capability of the first terminal.

Based on the one or more detection weight values determined for the one or more data-to-be-detected in step 62, a datum with a high detection weight value is preferentially detected within the maximum data detection capability of the first terminal. That is, in a case that a detection capability required for detecting all of the one or more data-to-be-detected exceeds the maximum data detection capability of the first terminal, a datum with high importance is preferentially detected, and an event corresponding to the detected datum is further processed so as to ensure a good running state of a vehicle and improve a driving safety.

Thus, according to the data detection method of the embodiments of the present disclosure, the first terminal determines, based on to the detected one or more pieces of SA information transmitted by the one or more second terminals, the one or more detection weight values corresponding to one or more the data-to-be-detected, and further continues to filter the one or more data-to-be-detected based on the one or more detection weight values, so that the first terminal preferentially detects data with high importance within the data detection capability of the first terminal, and the problem that important data when data-to-be-detected exceeds the maximum data detection capability of the terminal, important data may be lost due to incapability of determining a rule of discarding data.

Figure 7:
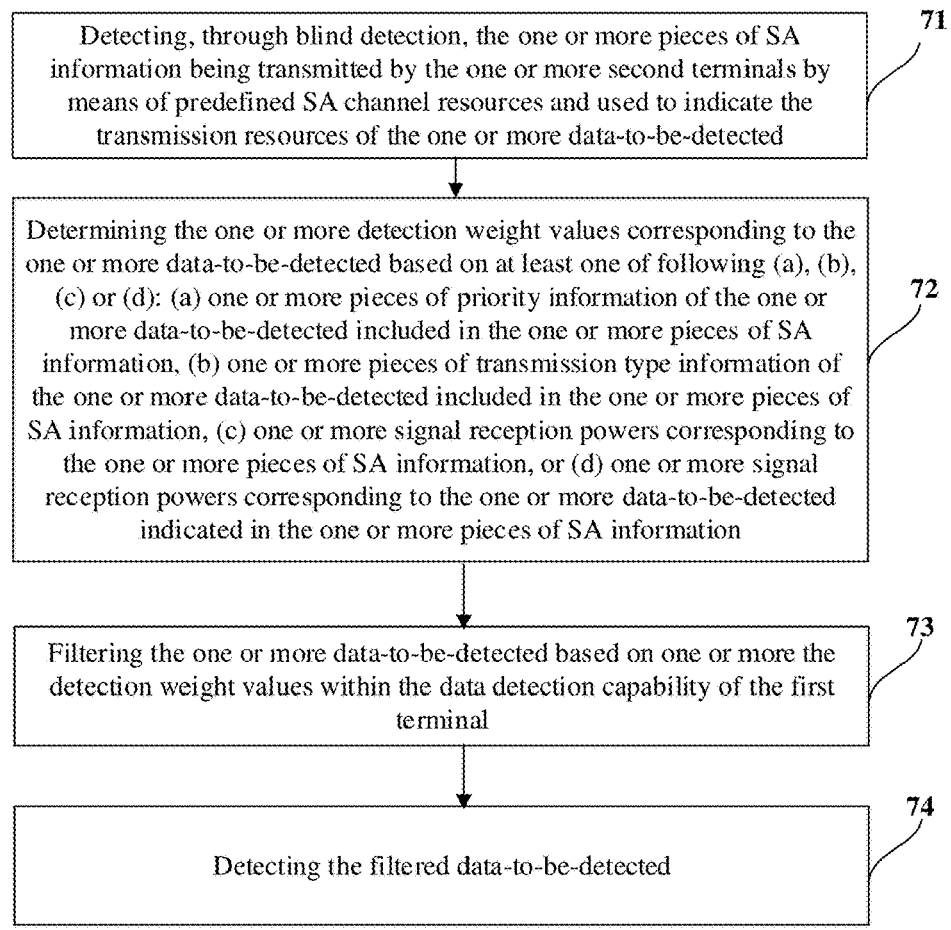
FIG. 7 illustrates a flow chart of a data detection method in some embodiments of the present disclosure.

In some optional embodiments, as shown in FIG. 7, a data detection method is provided in some embodiments of the present disclosure. Assuming that capabilities of a terminal (UE) includes a SA blind detection capability X and a data detection capability Y, wherein X denotes the number of SA channel resources blindly detectable by the UE, and Y denotes the number of PRBs to which data detection is performable by the UE. The data detection method of the embodiments of the present disclosure specifically includes the following steps 71-74.

Step 71: detecting, through blind detection, the one or more pieces of SA information transmitted by the one or more second terminals within predefined SA channel resources and used to indicate the transmission resources of the one or more data-to-be-detected.

The predefined SA channel resources are pre-configured based on a minimum of SA blind detection capabilities of the first terminal and the one or more second terminals; and/or, the predefined SA channel resources are configured by a base station based on the minimum of the SA blind detection capabilities of the first terminal and the one or more second terminals.

In a receiving process of the first terminal, the first terminal first needs to perform blind detection on locations of the SA channel resources, so as to detect and receive the one or more pieces of SA information, wherein a process of the blind detection is basically the same as a process of blindly detecting Downlink Control Information (DCI) in a LTE system. After the first terminal receives the one or more pieces of SA information, the first terminal determines transmission resources for corresponding data and corresponding MCSs based on one or more indications in the one or more pieces of SA information, thereby detecting the data. In particular, when the number of SA channel resources configured or pre-configured is larger than maximum SA blind detection times of the first terminal and the one or more second terminals, if the maximum SA blind detection times of the first terminal and the one or more second terminals are the same, that is, blind detection capabilities of the first terminal and the one or more second terminals are the same, and the number of SA channel resources may be configured based on the blind detection capabilities of the first terminal and the one or more second terminals. However, when the blind detection capabilities of the first terminal and the one or more second terminals are different, the base station may configure the SA channel resources based on a minimum of the SA blind detection capabilities of first terminal and the one or more second terminals; or the number of SA channel resources may be pre-configured based on the minimum of SA blind detection capability of the first terminal and the one or more second terminals within a coverage area of the base station, so as to ensure that the first terminal and the one or more second terminals do not miss detection of the SA information.

That is, during configuring or preconfiguring SA channel resources, different UEs may have a plurality of different SA blind detection capabilities. For example, maximum quantities of SA channel resources capable of being blindly detected by a $UE_1$ and a $UE_2$ are $X_1$ and $X_2$, respectively, then during configuring or pre-configuring SA channel resources, a quantity of configured or pre-configured SA channel resources needs to be configured according to a minimum of SA blind detection capabilities of $UE_1$ and $UE_2$ so that UEs with different SA blind detection capabilities may detect all of one or more pieces of SA information. That is, a quantity X of configured or pre-configured SA channel resources is less than or equal to Min ($X_1$, $X_2$).

In some optional embodiments, the one or more pieces of SA information includes, but is not limited to: one or more pieces of priority information of one or more data-to-be-detected, resource reservation period information, frequency-domain resource location information of another transmission, time interval information of initial transmission/retransmission, modulation and coding information, retransmission indication information and reservation/padding bit information, and the like. For example, each of the one or more pieces of SA information includes 3 bits for indicating one of the one or more pieces of priority information of one or more data-to-be-detected corresponding to the one of the one or more pieces of SA information, and 4 bits for indicating the resource reservation period information, 8 bits or less bits for indicating frequency-domain resource start position information or frequency-domain resource length information of another transmission, 4 bits for indicating the time interval information of initial transmission/retransmission, 5 bits for indicating the modulation and coding information, 7 bits or less bits for indicating the retransmission indication information and reservation/padding bit information.

Step 72: determining the one or more detection weight values corresponding to the one or more data-to-be-detected based on at least one of following (a), (b), (c) or (d): (a) one or more pieces of priority information of the one or more data-to-be-detected included in the one or more pieces of SA information, (b) one or more pieces of transmission type information of the one or more data-to-be-detected included in the one or more pieces of SA information, (c) one or more signal reception power values corresponding to the one or more pieces of SA information, or (d) one or more signal reception power values corresponding to the one or more data-to-be-detected indicated in the one or more pieces of SA information.

A subframe including the SA information received by the first terminal from other second terminals and a subframe including the data-to-be-detected indicated in the received SA information may be the same subframe or different subframes. For example, in a case that the SA information and the data associated with the SA information are not transmitted in the same subframe, or in a case that the SA information indicates resource-occupation-indication information for initially transmitted data and retransmitted data, when the first terminal receives the SA information associated with the initial transmitted data, information of subframes including the retransmitted data may be known. Specifically, in a case that the first terminal successfully receives the SA information associated with the initially transmitted data, but the initial transmitted data is not successfully received, since the SA information associated with the initially transmitted data also carries indication information indicating the retransmitted data, the first terminal may parse the received SA information associated with the initially transmitted data and obtain priority information, resource location information and so on about the retransmitted data so as to determine detection weight values of the retransmitted data when the first terminal does not successfully receive the SA information associated with the retransmitted data.

At least one of following (a), (b), (c), or (d): (a) the one or more pieces of priority information of the one or more data-to-be-detected corresponding to the SA information, (b) the one or more pieces of transmission type information of the one or more data-to-be-detected corresponding to the SA information, (c) one or more signal reception power values corresponding to the one or more pieces of SA information, or (d) one or more signal reception power values corresponding to the one or more data-to-be-detected indicated in the one or more pieces of SA information may be parsed based on the one or more pieces of SA information. Any of following (a) one or more pieces of the priority information of the one or more pieces of SA information, (b) the one or more pieces of transmission type information of the one or more pieces of data-to-be-detected corresponding to the one or more pieces of SA information, (c) the one or more signal reception power values corresponding to the one or more pieces of SA information, or (d) the one or more signal reception power values corresponding to the one or more data-to-be-detected indicated by the one or more pieces of SA information changes, the corresponding detection weight value may change.

An influence on the one or more detection weight values of the one or more data-to-be-detected by different parameters is briefly introduced above, and will be further explained in connection with specific application scenes hereinafter.

First scene: in a case that the one or more pieces of SA information include the one or more pieces of priority information of the one or more data-to-be-detected, the one or more detection weight values corresponding to the one or more data-to-be-detected are determined based on the one or more pieces of priority information of the one or more data-to-be-detected, wherein the higher a priority level of one of the one or more data-to-be-detected indicated by one of the one or more pieces of priority information is, the higher a detection weight value of the one or more detection weight values corresponding to the priority level is.

Second scene: in a case that the one or more pieces of SA information include the one or more pieces of transmission type information of the one or more data-to-be-detected, the one or more detection weight values corresponding to the one or more data-to-be-detected are determined based on the one or more pieces of transmission type information of the one or more data-to-be-detected, wherein a transmission type indicated by the one or more pieces of transmission type information includes initial transmission and retransmission, and a detection weight value corresponding to one of the one or more data-to-be-detected which is retransmitted after the initial transmission of the one of the one or more data-to-be-detected fails is larger than a detection weight value of another one of the one or more data-to-be-detected initially transmitted.

A data packet is transmitted twice at most (whether the data packet is transmitted once or twice is configurable). If the data packet is transmitted twice, then one transmission is initial transmission of the data packet and the other transmission is retransmission of the data packet. Both SA information associated with the initially transmitted data and SA information associated with the retransmitted data carry resource indication information about two transmissions of the data packet. If the SA information initially transmitted fails to be received correctly and the SA information corresponding to the retransmitted data is received correctly, then the UE does not need to detect the initially transmitted data based on resource indication information of the initially transmitted data indicated in the SA information corresponding to the retransmitted data.

Third scene: the one or more detection weight values corresponding to the one or more data-to-be-detected are determined based on one or more reference signal reception powers (RSRPs) of one or more demodulation reference signals (DMRSs) corresponding to the one or more pieces of SA information, wherein if a first RSRP of the one or more RSRPs of the DMRSs corresponding to the one or more pieces of SA information is larger than a second RSRP of the one or more RSRPs of the DMRSs corresponding to the one or more pieces of SA information, then a detection weight value corresponding to the first RSRP in the one or more detection weight values corresponding to the one or more data-to-be-detected is larger than a detection weight value corresponding to the second RSRP in the one or more detection weight values corresponding to the one or more data-to-be-detected.

Fourth scene: the one or more detection weight values corresponding to the one or more data-to-be-detected are determined based on one or more signal reception power values of one or more demodulation reference signals (DMRSs) corresponding to one or more the data-to-be-detected indicated by the one or more pieces of SA information, wherein if a first signal reception power value of the one or more signal reception power values of the one or more DMRSs corresponding to the one or more data-to-be-detected indicated by the one or more pieces of SA information is larger than a second signal reception power value of the one or more signal reception power values of the one or more DMRSs corresponding to the one or more data-to-be-detected indicated by the one or more pieces of SA information, then a detection weight value corresponding to the first signal reception power value in the one or more detection weight values corresponding to the one or more data-to-be-detected is larger than a detection weight value corresponding to the second signal reception power value in the one or more detection weight values corresponding to the one or more data-to-be-detected The one or more signal reception power of the one or more DMRSs corresponding to the one or more data-to-be-detected indicated by the one or more pieces of SA information includes the one or more RSRPs of the one or more DMRSs corresponding to the one or more data-to-be-detected, or one or more total signal reception powers of the one or more DMRSs corresponding to the one or more data-to-be-detected. That is, each of the one or more signal reception power values of the one or more DMRSs corresponding to the one or more data-to-be-detected indicated by the one or more pieces of SA information may be a linear average value of reception powers on resource elements (RE) of each DMRS in transmission resources of each of the one or more data-to-be-detected, or may also be a total signal reception power of all DMRSs in the transmission resources of each of the one or more data-to-be-detected. For example, pilot results of a V2V in a LTE system include four columns of DMRS symbols, and thus the signal reception power may be a linear average RSRP of signal reception powers in the four columns of DMRS symbols. The signal reception power may also be the total reception power of all DMRS symbols, i.e. equivalent to a product of RSRPs and the number of DMRS REs in one OFDM symbol in transmission resources of the data-to-be-detected. Based on the total signal reception power of the DMRS, a pathloss value may be calculated more accurately so that a datum-to-be-detected transmitted by a second terminal relatively being closer to the first terminal is to be preferentially received.

Specifically, in a case that the one or more detection weight values are associated with one of the above weight value parameters, the one or more detection weight values are determined by corresponding parameter information. For example, each of the one or more pieces of SA information may be parsed to obtain the priority information of the SA information, and then the detection weight value corresponding to the datum-to-be-detected may obtained based on the priority information of the datum-to-be-detected corresponding to the SA information. In addition, in a case that the detection weight value is associated with multiple parameters of the above weight parameters, the detection weight value corresponding to the datum-to-be-detected is determined by detection weight values corresponding to the weight parameters, wherein influences on the detection weight value corresponding to the datum-to-be-detected by different weight parameters may be different. For example, a first detection weight value corresponding to the datum-to-be-detected is obtained based on the priority information of the datum-to-be-detected corresponding to the SA information, a second detection weight value corresponding to the datum-to-be-detected is determined based on the transmission type information of the datum-to-be-detected corresponding to the SA information, a third detection weight value corresponding to the datum-to-be-detected is determined based on the signal reception power corresponding to the SA information, and a fourth detection weight value corresponding to the datum-to-be-detected is determined based on the signal reception power corresponding to the datum-to-be-detected indicated by the SA information. The detection weight value corresponding to the datum-to-be-detected is jointly determined by the first detection weight value, the second detection weight value, the third detection weight value and the fourth detection weight value. Generally, the detection weight value $W=a*W_1+b*W_2+c*W_3+d*W_4$, wherein a, b, c and d are influence coefficients of the above different weight parameters on the detection weight value corresponding to the datum-to-be-detected, and the $W_1$, $W_2$, $W_3$ and $W_4$ are detection weight values determined for the above different weight parameters, respectively, When a influence of a certain weight parameter on the detection weight value corresponding to the datum-to-be-detected is not considered, the influence coefficient of the certain weight parameter is 0. It should be pointed out that since influence extents of different weight parameters on the detection weight value corresponding to the datum-to-be-detected are different, different weight parameters may be divided into a primary weight parameter and secondary weight parameters. For example, assuming that the priority information of the datum-to-be-detected corresponding to the SA information is the primary weight parameter, the first terminal receives $SA_1$ and $SA_2$, and the priority level of the $SA_1$ is higher than that of the $SA_2$, then influences on the detection weight value corresponding to the datum-to-be-detected by the signal reception power corresponding to the SA information and the signal reception power corresponding to the datum-to-be-detected indicated by the SA information are not considered, a detection weight value of datum-to-be-detected corresponding to the $SA_1$ is determined to be higher than that of datum-to-be-detected corresponding to the $SA_2$. Only in a case that priority levels of the data-to-be-detected corresponding to $SA_1$ and $SA_2$ are the same, the influences on the detection weight value by the signal reception power corresponding to the SA information and the signal reception power corresponding to the data-to-be-detected indicated by the SA information need to be considered.

Step 73: filtering the one or more data-to-be-detected based on one or more the detection weight values within the data detection capability of the first terminal.

Step 73 will be further described below in conjunction with the first scene, the second scene, the third scene and the fourth scene above.

In case of the first scene, when determining the detection weight value corresponding to the datum-to-be-detected based on the priority information of the datum-to-be-detected, the first terminal may sort one or more priority levels of the one or more data-to-be-detected corresponding to the one or more pieces of SA information of different second terminals, and a datum-to-be-detected having a high priority level is preferentially received until a maximum value of the data detection capability of the first terminal is reached. Specifically, assuming that the number of PRBs from which the first terminal (a receiving UE) may detect data in the same subframe is 100, the receiving UE acquires the SA information through blind detection of SA channel resources, and the first terminal finds that four UEs need to transmit data in a current subframe, wherein the number of PRBs occupied by data transmission of UE1 is 48, a priority level of the data transmission of the UE1 is five; the number of PRBs occupied by data transmission of UE2 is 48, a priority level of the data transmission of the UE2 is four; the number of PRBs occupied by data transmission of UE3 is 8, a priority level of the data transmission of the UE3 is three; the number of PRBs occupied by data transmission of UE4 is 8, and a priority level of the data transmission of the UE4 is second. Considering that the number of PRBs from which the receiving UE may detect data in the same subframe is 100, the receiving UE may only detect data of the UE1 and the UE2 based on priority levels of the data transmissions of UE1-UE4, and the total number of PRBs from which data is detected is 48+48=96, only four PRBs are spared for further data detection, and the data transmission of each of UE3 and UE4 occupies eight PRBs. Therefore, the receiving UE may not detect data resources of any one of the UE3 and the UE4.

In case of the second scene, the one or more detection weight values corresponding to the one or more data-to-be-detected are determined based on the one or more pieces of transmission type information of one or more the data-to-be-detected. When a data packet is configured to be transmitted twice, the first terminal may provide different processing procedures in a case that initially transmitted data from a second terminal is correctly received or incorrectly received by the first terminal. Specifically, in a case that the first terminal correctly receives the initially transmitted data of the second terminal, the first terminal does not detect resources of the retransmitted data of the second terminal. In a case that the initial transmitted data of the second terminal is incorrectly received by the first terminal, the first terminal needs to preferentially detect resources of the retransmitted data corresponding to the second terminal. It is assumed that the number of PRBs from which the first terminal (the receiving UE) may detect data in the same subframe is 100, and a data packet is transmitted twice, one transmission is the initial transmission and the other transmission is the retransmission. It is assumed that two second terminals (transmitting UEs, UE1 and UE2) need to transmit data in the current subframe and priority levels of data transmissions of the two second terminals are the same. A data transmission of the UE1 is the initial transmission, and the number of PRBs occupied by the data transmission of the UE1 is 48; a data transmission of the UE2 is the retransmission, and the number of PRBs occupied by the data transmission of the UE2 is 54, but the initial transmission of the UE2 has been received correctly, thus, the receiving UE only needs to receive the data transmission of the UE1. It is also assumed that the number of PRBs from which the receiving UE may detect data in the same subframe is 100, and a data packet is transmitted twice, one transmission of the two transmissions is the initial transmission and the other transmission of the two transmissions is the retransmission. It is assumed that two second terminals (transmitting UEs, UE1, and UE2) need to transmit data in the current subframe, and priority levels of data transmissions of the UE1 and the UE 2 are the same. The data transmission of the UE1 is the initial transmission, and the number of PRBs occupied by the data transmission of the UE1 is 48; and the data transmission of the UE2 is the retransmission, and the number of PRBs occupied by the data transmission of the UE2 is 54, but the initial transmission of the UE2 is incorrectly received. Since 48+54=102 PRBs have exceeded the 100-PRB processing capability of the receiving UE, the receiving UE preferentially receives 54 PRBs retransmitted by the UE2.

In case of the third scene, the one or more detection weight values corresponding to the one or more data-to-be-detected are determined based on one or more reference signal reception powers (RSRPs) of one or more demodulation reference signals (DMRSs) corresponding to the one or more pieces of SA information. Based on RSRP measurement results of DMRSs of the one or more pieces of SA information transmitted by other second terminals and received by the first terminal, the first terminal preferentially detects data indicated by a piece of SA information having a relatively high RSRP. Assuming that the number of PRBs from which the first terminal (the receiving UE) may detect data in the same subframe is 100, the receiving UE acquires SA information through blind detection of SA channel resources. Assuming that four second terminals (transmitting UEs, UE1, UE2, UE3 and UE4) need to transmit data in the current subframe, wherein the number of PRBs occupied by data transmission of the UE1 is 48; the number of PRBs occupied by data transmission of the UE2 is 48; the number of PRBs occupied by data transmission of the UE3 is 8; the number of PRBs occupied by data transmission of the UE4 is 8. Priority levels of the data transmissions of the four transmitting UEs are the same. The receiving UE may determine, based on the reference signal reception powers (RSRPs) of the DMRSs of the SA information transmitted by the four UEs and received by the receiving UE, which one of the four data transmissions is preferentially received. Assuming that RSRPs of the DMRS of the SA information transmitted by the four transmitting UEs and received by the receiving UE are P1>P3>P4>P2, the receiving UE preferentially detects 48 PRBs of the UE1 and 8 PRBs of the UE3, and eight PRBs of the UE4, while 48 PRBs of the UE2 may not be detected. In some optional embodiments, a received power P may be the RSRP of the DMRS of the SA information or may be a linear average value of total powers of OFDM symbols corresponding to the SA information. Since different pieces of SA information correspond to the same number of DMRS, an order of the RSRPs of the DMRSs of the SA information is the same as the order of the received total powers of the DMRS.

In case of the fourth scene, the one or more detection weight values corresponding to the one or more data-to-be-detected are determined based on the one or more signal reception power values of the one or more DMRSs corresponding to the one or more data-to-be-detected indicated by the one or more pieces of SA information. Specifically, the first terminal may preferentially detect, based on measurement results of RSRPs of the DMRSs in data resources of data-to-be-detected indicated by the one or more pieces of SA information, a data resource with a high RSRP. Optionally, the first terminal may also, based on indication information of the DMRSs in the data resources indicated by the SA information, rank total reception powers of the DMRSs corresponding to the data resources, a data resource having a high total reception power is preferentially detected. Specifically, assuming that the number of PRBs from which the first terminal (the receiving UE) may detect data in the same subframe is 100, the receiving UE acquires the SA information through blind detection of SA channel resources. Assume that four second terminals (transmitting UEs, UE1, UE2, UE3 and UE4) are found to need to transmit data in the current subframe, wherein the number of PRBs occupied by the data transmission of the UE1 is 48; the number of PRBs occupied by the data transmission of the UE2 is 48; the number of PRBs occupied by the data transmission of the UE3 is 8; the number of PRBs occupied by the data transmission of the UE4 is 8. Priority levels of the data transmissions of the four UEs are the same. Then the receiving UE may determine, based on RSRPs of DMRS corresponding to the data-to-be-detected indicated by the SA information transmitted by the four UEs and received by the receiving UE or based on a linear average value of total reception powers of OFDM symbols of the DMRS corresponding to the data-to-be-detected, determine which of the four data transmissions is preferentially performed. Assuming that RSRPs of DMRSs corresponding to the data-to-be-detected indicated by the SA information transmitted by the four UEs and received by the receiving UE or the total reception powers of OFDM symbols of the DMRS corresponding to the data-to-be-detected are P1>P3>P4>P2, the receiving UE may preferentially detect 48 PRBs of UE1, 8 PRBs of UE3, and 8 PRBs of UE4, while the 48 PRBs of UE2 may not be detected.

When a detection capability required for detecting all data-to-be-detected exceeds a maximum value of the data detection capability of the first terminal, after the respective detection weight values corresponding to the data-to-be-detected are determined, data detection may be performed in a random manner until the maximum number of PRBs that may be detected by the first terminal is reached. Optionally, the data-to-be-detected may be grouped into at least two groups, wherein the detection weight values are sorted in a descending order to obtain a detection weight value sequence; data-to-be-detected corresponding to the first N detection weight values in the detection weight value sequence is determined as a first group, and remaining data-to-be-detected is determined as a second group, wherein N is a positive integer. The data-to-be-detected in the first group is preferentially detected, and in addition, the data-to-be-detected in the first group may be data-to-be-detected indicated by the SA information and having a priority level higher than a configured or preconfigured priority threshold, and/or may be retransmitted data-to-be-detected, an initial transmission of which is incorrectly received. After the first terminal detects the data-to-be-detected in the first group and if the first terminal has a remaining detection capability, the data-to-be-detected in the second group may be selectively detected in a random manner.

Figure 8:
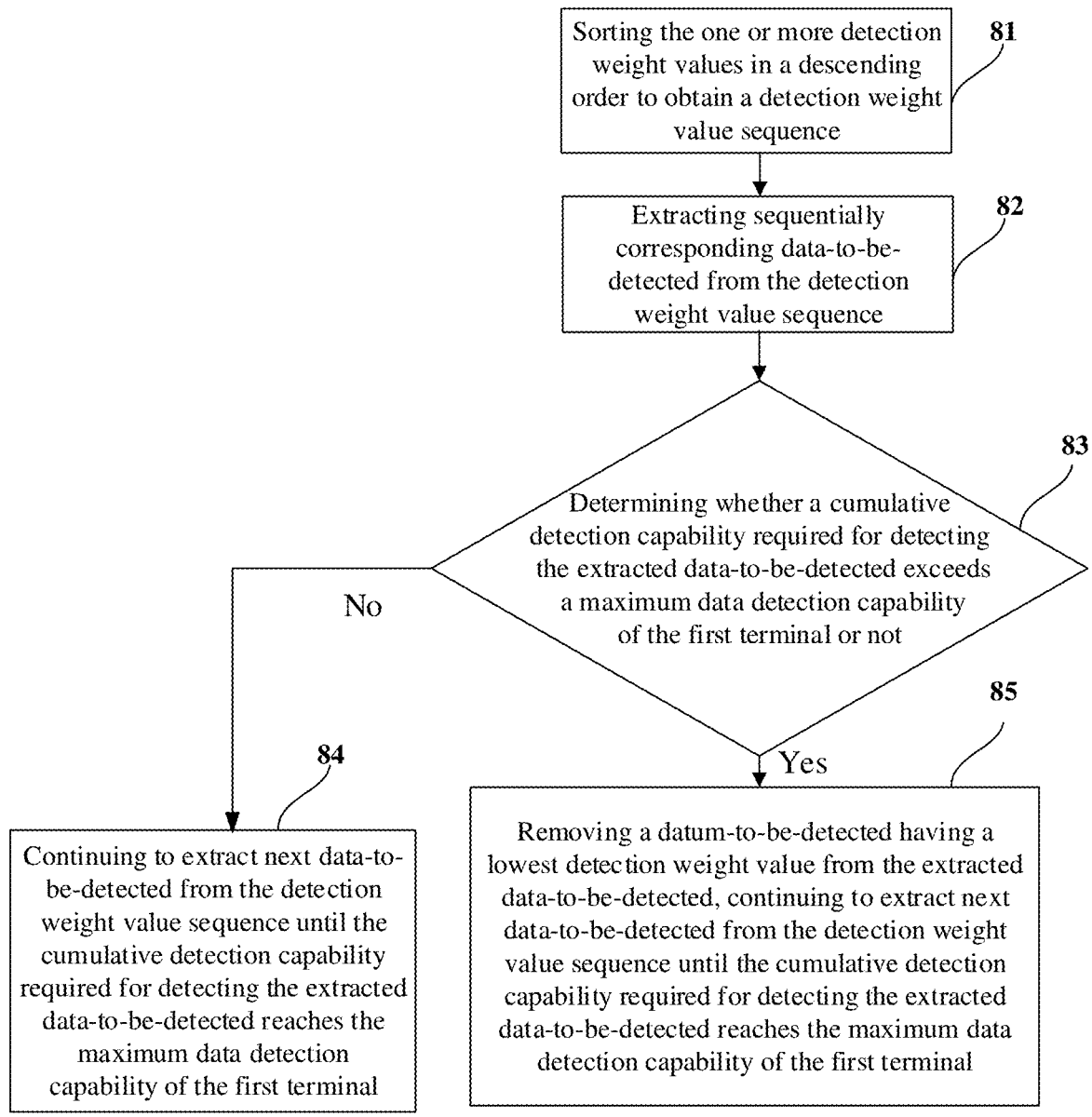
FIG. 8 shows a flow chart of specific implementation of a step 73 in FIG. 7.

In some optional embodiments, in addition to filtering the data-to-be-detected in a random selective manner, the step 73 may also filter the data-to-be-detected with reference to the following steps 81-85. Specifically, as shown in FIG. 8, Step 81: sorting the one or more detection weight values in a descending order to obtain a detection weight value sequence.

Step 82: extracting sequentially corresponding data-to-be-detected from the detection weight value sequence.

Step 83: determining whether a cumulative detection capability required for detecting the extracted data-to-be-detected exceeds a maximum data detection capability of the first terminal or not; if not exceed, proceeding to step 84; otherwise, proceeding to step 85.

Step 84: continuing to extract next data-to-be-detected from the detection weight value sequence until the cumulative detection capability required for detecting the extracted data-to-be-detected reaches the maximum data detection capability of the first terminal.

Step 85: removing a datum-to-be-detected having a lowest detection weight value from the extracted data-to-be-detected, continuing to extract next data-to-be-detected from the detection weight value sequence until the cumulative detection capability required for detecting the extracted data-to-be-detected reaches the maximum data detection capability of the first terminal.

Assuming that the number of PRBs from which the first terminal (the receiving UE) may detect data in the same subframe is 100, the receiving UE acquires the SA information through blind detection of SA channel resources, and four second terminals are found (transmitting UEs, UE1, UE2, UE3 and UE4) to need to transmit data in the current subframe, wherein the number of PRBs occupied by data transmission of the UE1 is 48; the number of PRBs occupied by data transmission of the UE2 is 54; the number of PRBs occupied by data transmission of the UE3 is 8; the number of PRBs occupied by data transmission of the UE4 is 8. Detection weight values sequentially corresponding to UE1, UE2, UE3 and UE4 are in a descending order from high to low, the datum-to-be-detected of UE1 is preferentially extracted, the required detection capability is 48 PRBs; the datum-to-be-detected of UE2 is extracted thereafter, and the cumulative data detection capability is 48 PRBs+54 PRBs=102 PRBs which exceeds the maximum data detection capability of the receiving UE. In such a case, the datum-to-be-detected of UE2 needs to be discarded. Next, the datum-to-be-detected of UE3 and the datum-to-be-detected of UE4 are extracted sequentially, and the cumulative data detection capability obtained through re-calculation is 48 PRBs+8 PRBs+8 PRBs=64 PRBs, and then the process of filtering data-to-be-detected is terminated. It should be noted that one of termination conditions for the process of filtering data-to-be-detected is that the detection capability required for detecting the extracted data-to-be-detected reaches the maximum data detection capability of the first terminal, and another of the termination conditions is that all of the data-to-be-detected corresponding to the received SA information have been extracted.

Step 74: detecting the filtered data-to-be-detected.

Within the maximum data detection capability of the first terminal, detecting the filtered data-to-be-detected ensures data-to-be-detected with high importance is detected preferentially. Event corresponding to the detected data are processed so as to guarantee a good running condition of the vehicle and improve the driving safety.

Thus, according to the data detection method of the embodiments of the present disclosure, the first terminal determines the detection weight values corresponding to the data-to-be-detected based on the detected SA information, and further continues to filter the data-to-be-detected based on the detection weight values, so that important data are preferentially detected within the data detection capability of the first terminal and the problem that important data may be lost due to incapability of determining a rule of discarding data when data-to-be-detected exceeds the maximum data detection capability of the terminal is avoided. The weight parameters indicated by the SA information are different, and the detection weight values of the determined data-to-be-detected are different.

The above embodiments describe the data detection method of the present disclosure, and a terminal corresponding to the data detection method will be further explained with reference to the accompanying drawings.

Figure 9:
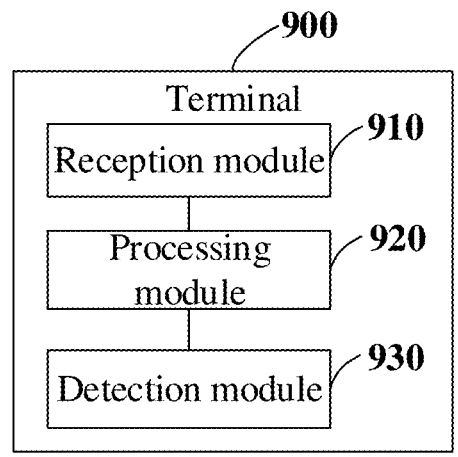
FIG. 9 illustrates a schematic diagram of modules in a terminal in some embodiments of the present disclosure.

In particular, as shown in FIG. 9, the embodiments of the present disclosure also provide a terminal 900 applied to a first terminal. Specifically, the terminal includes a reception module 910, a processing module 920 and a detection module 930. The reception module 910 is configured to receive one or more pieces of scheduling allocation (SA) information transmitted by one or more second terminals and used to indicate transmission resources of one or more data-to-be-detected. The processing module 920 is configured to determine, based on the one or more pieces of SA information, one or more detection weight values corresponding to the one or more data-to-be-detected. The detection module 930 is configured to detect, based on the one or more detection weight values, the one or more data-to-be-detected within a data detection capability of the first terminal 1.

The reception module 910 includes a first detection unit. The first detection unit is configured to detect, through blind detection, the one or more pieces of SA information transmitted by the one or more second terminals within predefined SA channel resources and used to indicate the transmission resources of the one or more data-to-be-detected, wherein the predefined SA channel resources are pre-configured based on a minimum of SA blind detection capabilities of the first terminal and the one or more second terminals, and/or, the predefined SA channel resources are configured by a base station based on the minimum of the SA blind detection capabilities of the first terminal and the one or more second terminals.

The processing module 920 includes a processing unit. The processing unit is configured to determine the one or more detection weight values corresponding to the one or more data-to-be-detected based on at least one of following (a), (b), (c) or (d): (a) one or more pieces of priority information of the one or more data-to-be-detected included in the one or more pieces of SA information, (b) one or more pieces of transmission type information of the one or more data-to-be-detected included in the one or more pieces of SA information, (c) one or more signal reception power values corresponding to the one or more pieces of SA information, or (d) one or more signal reception power values corresponding to the one or more data-to-be-detected indicated in the one or more pieces of SA information.

In a case that the one or more pieces of SA information include the one or more pieces of priority information of the one or more data-to-be-detected, the processing unit includes a first processing sub-unit. The first processing sub-unit is configured to determine the one or more detection weight values corresponding to the one or more data-to-be-detected based on the one or more pieces of priority information of the one or more data-to-be-detected, wherein the higher a priority level of one of the one or more data-to-be-detected indicated by one of the one or more pieces of priority information is, the higher a detection weight value of the one or more detection weight values corresponding to the priority level is.

In a case that the one or more pieces of SA information include the one or more pieces of transmission type information of the one or more data-to-be-detected, the processing unit includes a second processing sub-unit. The second processing sub-unit is configured to determine the one or more detection weight values corresponding to the one or more data-to-be-detected based on the one or more pieces of transmission type information of the one or more data-to-be-detected, wherein a transmission type indicated by the one or more pieces of transmission type information includes initial transmission and retransmission, and a detection weight value corresponding to one of the one or more data-to-be-detected which is retransmitted after the initial transmission of the one of the one or more data-to-be-detected fails is larger than a detection weight value of another one of the one or more data-to-be-detected initially transmitted.

The processing unit further includes a third processing sub-unit. The third processing sub-unit is configured to determine the one or more detection weight values corresponding to the one or more data-to-be-detected based on one or more reference signal reception powers (RSRPs) of one or more demodulation reference signals (DMRSs) corresponding to the one or more pieces of SA information, wherein if a first RSRP of the one or more RSRPs of the DMRSs corresponding to the one or more pieces of SA information is larger than a second RSRP of the one or more RSRPs of the DMRSs corresponding to the one or more pieces of SA information, then a detection weight value corresponding to the first RSRP in the one or more detection weight values corresponding to the one or more data-to-be-detected is larger than a detection weight value corresponding to the second RSRP in the one or more detection weight values corresponding to the one or more data-to-be-detected.

The processing unit further includes a fourth processing sub-unit. The fourth processing sub-unit is configured to determine the one or more detection weight values corresponding to the one or more data-to-be-detected based on one or more signal reception power values of one or more demodulation reference signals (DMRSs) corresponding to one or more the data-to-be-detected indicated by the one or more pieces of SA information, wherein if a first signal reception power value of the one or more signal reception power values of the one or more DMRSs corresponding to the one or more data-to-be-detected indicated by the one or more pieces of SA information is larger than a second signal reception power value of the one or more signal reception power values of the one or more DMRSs corresponding to the one or more data-to-be-detected indicated by the one or more pieces of SA information, then a detection weight value corresponding to the first signal reception power value in the one or more detection weight values corresponding to the one or more data-to-be-detected is larger than a detection weight value corresponding to the second signal reception power value in the one or more detection weight values corresponding to the one or more data-to-be-detected.

The one or more signal reception power values of the one or more DMRSs corresponding to the one or more data-to-be-detected indicated by the one or more pieces of SA information include: the one or more RSRPs of the one or more DMRSs corresponding to the one or more data-to-be-detected, or one or more total signal reception powers of the one or more DMRSs corresponding to the one or more data-to-be-detected.

The detection module 930 includes a filtering unit and a second detection unit. The filtering unit is configured to filter the one or more data-to-be-detected based on one or more the detection weight values within the data detection capability of the first terminal. The second detection unit is configured to detect the filtered data-to-be-detected.

The filtering unit includes a sorting sub-unit, an extracting sub-unit, a determination sub-unit, a first filtering sub-unit, and a second filtering sub-unit. The sorting sub-unit is configured to sort the one or more detection weight values in a descending order to obtain a detection weight value sequence. The extracting sub-unit is configured to extract sequentially corresponding data-to-be-detected from the detection weight value sequence. The determination sub-unit is configured to determine whether a cumulative detection capability required for detecting the extracted data-to-be-detected exceeds a maximum data detection capability of the first terminal or not. The first filtering sub-unit is configured to, in a case that the cumulative detection capability required for detecting the extracted data-to-be-detected does not exceed a maximum data detection capability of the first terminal, continue to extract next data-to-be-detected from the detection weight value sequence until the cumulative detection capability required for detecting the extracted data-to-be-detected reaches the maximum data detection capability of the first terminal. The second filtering sub-unit is configured to, in a case that the cumulative detection capability required for detecting the extracted data-to-be-detected exceeds the maximum data detection capability of the first terminal, remove data-to-be-detected having a lowest detection weight value from the extracted data-to-be-detected, continue to extract next data-to-be-detected from the detection weight value sequence until the cumulative detection capability required for detecting the extracted data-to-be-detected reaches the maximum data detection capability of the first terminal.

Figure 10:
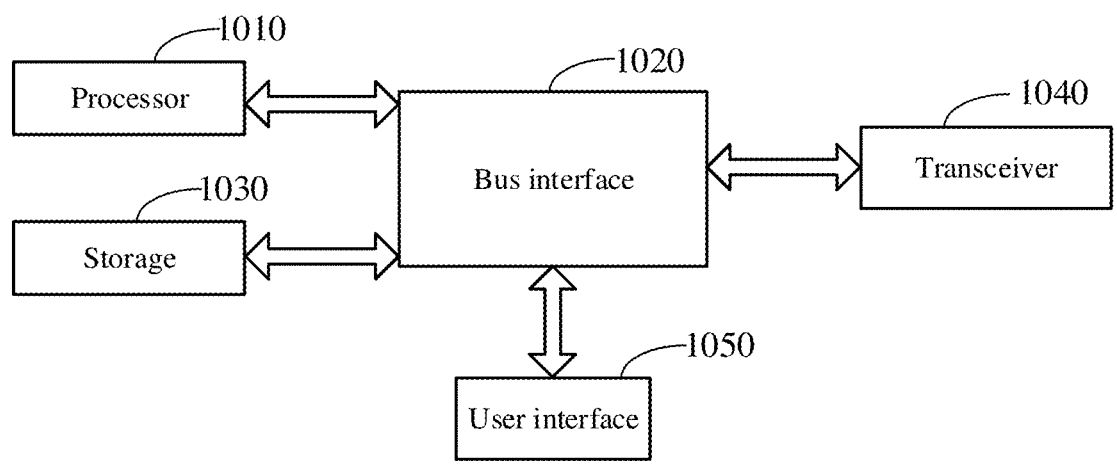
FIG. 10 is a block diagram showing a structure of a terminal in some embodiments of the present disclosure.

The embodiment of the terminal of the present disclosure corresponds to the embodiment of the above-described data detection method, and all implementation means in the above-described process embodiment are applicable to the embodiment of the terminal, and the same technical effects may be achieved. The first terminal determines the detection weight values corresponding to the data-to-be-detected based on the detected SA information transmitted by one or more second terminals, and further continues to filter the data-to-be-detected based on the detection weight values, so that important data are preferentially detected within the data detection capability of the first terminal and the problem that important data may be lost due to incapability of determining a rule of discarding data when data-to-be-detected exceeds the maximum data detection capability of the terminal is avoided. In some optional embodiments, in order to better achieve the above objects the present disclosure also provides a terminal, as shown in FIG. 10. The terminal includes a processor 1010, a storage 1030 connected to the processor 1010 through a bus interface 1020, and a transceiver 104 connected to the processor 1010 through the bus interface 1020. The storage 1030 is configured to store programs and data used by the processor 1010 when the processor 1010 performs operations. The transceiver 1040 is configured to receive data and transmit data under a control of the processor 1010. When the processor 1010 invokes and executes the programs and the data stored in the storage 1030, the processor 1010 performs following steps: receiving, by the transceiver 1040 under a control of the processor 1010, one or more pieces of scheduling allocation (SA) information transmitted by one or more second terminals and used to indicate transmission resources of one or more data-to-be-detected; determining, by the processor 1010, based on the one or more pieces of SA information, one or more detection weight values corresponding to the one or more data-to-be-detected; detecting, based on the one or more detection weight values by the processor 1010, the one or more data-to-be-detected within a data detection capability of the first terminal.

It should be noted that in FIG. 10, a bus architecture may include any number of interconnected buses and bridges. Specifically, various circuits including one or more processors represented by the processor 1010 and a storage represented by the storage 1030 are linked together. The bus architecture may also link together various other circuits such as peripheral devices, voltage regulators, and power management circuits, etc., which are well known in the art and therefore will not be further described herein. The bus interface provides an interface. The transceiver 1040 may be a plurality of elements including a transmitter, a receiver, and communication elements used to communicate with various other devices over a transmission medium. For different terminals, a user interface 1050 may also be an interface capable of externally or internally interfacing required devices, the required device includes, but is not limited to, keypads, displays, speakers, microphones, joysticks, and the like. Processor 1010 is responsible for managing the bus architecture and general processing transactions. The storage 1030 may store data used by the processor 1010 when the processor 1010 performs operations.

It will be understood by those skilled in the art that all or part of the steps for implementing the above-described embodiments may be performed by hardware, or may be performed by a computer program indicating the relevant hardware. The computer program includes instructions used to perform some or all of the steps of the method described above. The computer program may be stored in a readable storage medium which may be any form of storage medium.

Furthermore, it should be noted that in the devices and methods of the present disclosure, it is apparent that the components or steps may be decomposed and/or recombined. These decomposition and/or recombination shall be regarded as equivalent solution of the present disclosure. The steps of performing a series of processes described above may naturally be performed in a chronological order in the order described, but need not necessarily be performed in the chronological order, and some steps may be performed in parallel or independently of each other. It will be understood by those of ordinary skills in the art that all or any of the steps or components of the methods and the devices of the present disclosure may be implemented in any computing device (including a processor, a storage medium, etc.) or in a network of computing devices, or in firmware, software, or a combination thereof, and may be implemented by one of ordinary skill in the art using their basic programming skills upon reading the description of the present disclosure.

Accordingly, the objective of the present disclosure may also be achieved by running a program or a set of programs on any computing device. The computing device may be a commonly known device. Accordingly, the objective of the present disclosure may also be achieved by merely providing a program product containing program codes implementing the method or apparatus. That is, such a program product also constitutes the present disclosure, and a storage medium storing such a program product also constitutes the present disclosure. Obviously, the storage medium may be any known storage medium or any storage medium developed in the future. It should also be noted that in the devices and methods of the present disclosure, it is apparent that the components or steps may be decomposed and/or recombined. These decomposition and/or recombination shall be regarded as equivalent solutions of the present disclosure. Furthermore, the steps of executing the series of steps described above may naturally be executed in a chronological order in the described order, but need not necessarily be executed in the chronological order. Some of the steps may be performed in parallel or independently of one another.

The foregoing are optional embodiments of the present disclosure and it should be noted that several modifications and embellishments may be made to the present disclosure by those of ordinary skills in the art without departing from the principles of the present disclosure. These modifications and embellishments should also be considered to be within the scope of the present disclosure.

What is claimed is:

1. A data detection method, the method being applied to a first terminal and comprising:
    receiving one or more pieces of scheduling allocation (SA) information transmitted by one or more second terminals and used to indicate transmission resources of one or more data-to-be-detected;
    determining, based on the one or more pieces of SA information, one or more detection weight values corresponding to the one or more data-to-be-detected;
    detecting, based on the one or more detection weight values, the one or more data-to-be-detected within a data detection capability of the first terminal.

2. The data detection method according to claim 1, wherein, the receiving SA information transmitted by the one or more second terminals and used to indicate the transmission resources of the one or more data-to-be-detected, comprises:
    detecting, through blind detection, the one or more pieces of SA information transmitted by the one or more second terminals within predefined SA channel resources and used to indicate the transmission resources of the one or more data-to-be-detected, wherein the predefined SA channel resources are pre-configured based on a minimum of SA blind detection capabilities of the first terminal and the one or more second terminals, and/or, the predefined SA channel resources are configured by a base station based on the minimum of the SA blind detection capabilities of the first terminal and the one or more second terminals.

3. The data detection method according to claim 1, wherein, the determining, based on the one or more pieces of SA information, the one or more detection weight values corresponding to the one or more data-to-be-detected, comprises:
    determining the one or more detection weight values corresponding to the one or more data-to-be-detected based on at least one of following (a), (b), (c) or (d):
    (a) one or more pieces of priority information of the one or more data-to-be-detected comprised in the one or more pieces of SA information, (b) one or more pieces of transmission type information of the one or more data-to-be-detected comprised in the one or more pieces of SA information, (c) one or more signal reception power values corresponding to the one or more pieces of SA information, or (d) one or more signal reception power values corresponding to the one or more data-to-be-detected indicated in the one or more pieces of SA information.

4. The data detection method according to claim 3, wherein, in a case that the one or more pieces of SA information comprise the one or more pieces of priority information of the one or more data-to-be-detected, the determining, based on the one or more pieces of SA information, the one or more detection weight values corresponding to the one or more data-to-be-detected, comprises:
    determining the one or more detection weight values corresponding to the one or more data-to-be-detected based on the one or more pieces of priority information of the one or more data-to-be-detected, wherein the higher a priority level of one of the one or more data-to-be-detected indicated by one of the one or more pieces of priority information is, the higher a detection weight value of the one or more detection weight values corresponding to the priority level is.

5. The data detection method according to claim 3, wherein, in a case that the one or more pieces of SA information comprise the one or more pieces of transmission type information of the one or more data-to-be-detected, the determining, based on the one or more pieces of SA information, the one or more detection weight values corresponding to the one or more data-to-be-detected, comprises:
    determining the one or more detection weight values corresponding to the one or more data-to-be-detected based on the one or more pieces of transmission type information of the one or more data-to-be-detected, wherein a transmission type indicated by the one or more pieces of transmission type information comprises initial transmission and retransmission, and a detection weight value corresponding to one of the one or more data-to-be-detected which is retransmitted after the initial transmission of the one of the one or more data-to-be-detected fails is larger than a detection weight value of another one of the one or more data-to-be-detected initially transmitted.

6. The data detection method according to claim 3, wherein, the determining, based on the one or more pieces of SA information, the one or more detection weight values corresponding to the one or more data-to-be-detected, comprises:
    determining the one or more detection weight values corresponding to the one or more data-to-be-detected based on one or more reference signal reception powers (RSRPs) of one or more demodulation reference signals (DMRSs) corresponding to the one or more pieces of SA information, wherein if a first RSRP of the one or more RSRPs of the DMRSs corresponding to the one or more pieces of SA information is larger than a second RSRP of the one or more RSRPs of the DMRSs corresponding to the one or more pieces of SA information, then a detection weight value corresponding to the first RSRP in the one or more detection weight values corresponding to the one or more data-to-be-detected is larger than a detection weight value corresponding to the second RSRP in the one or more detection weight values corresponding to the one or more data-to-be-detected.

7. The data detection method according to claim 3, wherein, the determining, based on the one or more pieces of SA information, the one or more detection weight values corresponding to the one or more data-to-be-detected, comprises:
    determining the one or more detection weight values corresponding to the one or more data-to-be-detected based on one or more signal reception power values of one or more demodulation reference signals (DMRSs) corresponding to one or more the data-to-be-detected indicated by the one or more pieces of SA information, wherein if a first signal reception power value of the one or more signal reception power values of the one or more DMRSs corresponding to the one or more datato-be-detected indicated by the one or more pieces of SA information is larger than a second signal reception power value of the one or more signal reception power values of the one or more DMRSs corresponding to the one or more data-to-be-detected indicated by the one or more pieces of SA information, then a detection weight value corresponding to the first signal reception power value in the one or more detection weight values corresponding to the one or more data-to-be-detected is larger than a detection weight value corresponding to the second signal reception power value in the one or more detection weight values corresponding to the one or more data-to-be-detected.

8. The data detection method according to claim 7, wherein, the one or more signal reception power values of the one or more DMRSs corresponding to the one or more data-to-be-detected indicated by the one or more pieces of SA information comprises: the one or more RSRPs of the one or more DMRSs corresponding to the one or more data-to-be-detected, or one or more total signal reception powers of the one or more DMRSs corresponding to the one or more data-to-be-detected.

9. The data detection method according to claim 1, wherein, detecting, based on the one or more detection weight values, the one or more data-to-be-detected within the data detection capability of the first terminal, comprises:
filtering the one or more data-to-be-detected based on one or more the detection weight values within the data detection capability of the first terminal;
detecting the filtered data-to-be-detected.

10. The data detection method according to claim 9, wherein, filtering the one or more data-to-be-detected based on the one or more detection weight values within the data detection capability of the first terminal, comprises:
sorting the one or more detection weight values in a descending order to obtain a detection weight value sequence;
extracting sequentially corresponding data-to-be-detected from the detection weight value sequence;
determining whether a cumulative detection capability required for detecting the extracted data-to-be-detected exceeds a maximum data detection capability of the first terminal or not;
if the cumulative detection capability required for detecting the extracted data-to-be-detected does not exceed the maximum data detection capability of the first terminal, continuing to extract next data-to-be-detected from the detection weight value sequence until the cumulative detection capability required for detecting the extracted data-to-be-detected reaches the maximum data detection capability of the first terminal;
if the cumulative detection capability required for detecting the extracted data-to-be-detected exceeds the maximum data detection capability of the first terminal, removing a datum-to-be-detected having a lowest detection weight value from the extracted data-to-be-detected, continuing to extract next data-to-be-detected from the detection weight value sequence until the cumulative detection capability required for detecting the extracted data-to-be-detected reaches the maximum data detection capability of the first terminal.

11. A terminal applied to a first terminal and comprising:
a reception circuit, configured to receive one or more pieces of scheduling allocation (SA) information transmitted by one or more second terminals and used to indicate transmission resources of one or more data-to-be-detected;
a processing circuit, configured to determine, based on the one or more pieces of SA information, one or more detection weight values corresponding to the one or more data-to-be-detected;
a detection circuit, configured to detect, based on the one or more detection weight values, the one or more data-to-be-detected within a data detection capability of the first terminal.

12. A terminal, comprising:
a processor,
a storage, configured to store programs and data used by the processor when the processor performs operations, and
a transceiver, configured to transmit data and receive data,
wherein, when the processor invokes and executes the programs and the data stored in the storage, the processor performs following steps:
receiving, by the transceiver under a control of the processor, one or more pieces of scheduling allocation (SA) information transmitted by one or more second terminals and used to indicate transmission resources of one or more data-to-be-detected;
determining, by the processor, based on the one or more pieces of SA information, one or more detection weight values corresponding to the one or more data-to-be-detected;
detecting, based on the one or more detection weight values by the processor, the one or more data-to-be-detected within a data detection capability of the first terminal.

13. The terminal according to claim 12, wherein, the receiving SA information transmitted by the one or more second terminals and used to indicate the transmission resources of the one or more data-to-be-detected, comprises:
detecting, through blind detection, the one or more pieces of SA information transmitted by the one or more second terminals within predefined SA channel resources and used to indicate the transmission resources of the one or more data-to-be-detected, wherein the predefined SA channel resources are pre-configured based on a minimum of SA blind detection capabilities of the first terminal and the one or more second terminals, and/or, the predefined SA channel resources are configured by a base station based on the minimum of the SA blind detection capabilities of the first terminal and the one or more second terminals.

14. The terminal according to claim 12, wherein, the determining, based on the one or more pieces of SA information, the one or more detection weight values corresponding to the one or more data-to-be-detected, comprises:
determining the one or more detection weight values corresponding to the one or more data-to-be-detected based on at least one of following (a), (b), (c) or (d):
(a) one or more pieces of priority information of the one or more data-to-be-detected comprised in the one or more pieces of SA information, (b) one or more pieces of transmission type information of the one or more data-to-be-detected comprised in the one or more pieces of SA information, (c) one or more signal reception power values corresponding to the one or more pieces of SA information, or (d) one or more signal reception power values corresponding to the one or more data-to-be-detected indicated in the one or more pieces of SA information.

15. The terminal according to claim 14, wherein, in a case that the one or more pieces of SA information comprise the one or more pieces of priority information of the one or more data-to-be-detected, the determining, based on the one or more pieces of SA information, the one or more detection weight values corresponding to the one or more data-to-be-detected, comprises:
  determining the one or more detection weight values corresponding to the one or more data-to-be-detected based on the one or more pieces of priority information of the one or more data-to-be-detected, wherein the higher a priority level of one of the one or more data-to-be-detected indicated by one of the one or more pieces of priority information is, the higher a detection weight value of the one or more detection weight values corresponding to the priority level is.

16. The terminal according to claim 14, wherein, in a case that the one or more pieces of SA information comprise the one or more pieces of transmission type information of the one or more data-to-be-detected, the determining, based on the one or more pieces of SA information, the one or more detection weight values corresponding to the one or more data-to-be-detected, comprises:
  determining the one or more detection weight values corresponding to the one or more data-to-be-detected based on the one or more pieces of transmission type information of the one or more data-to-be-detected, wherein a transmission type indicated by the one or more pieces of transmission type information comprises initial transmission and retransmission, and a detection weight value corresponding to one of the one or more data-to-be-detected which is retransmitted after the initial transmission of the one of the one or more data-to-be-detected fails is larger than a detection weight value of another one of the one or more data-to-be-detected initially transmitted.

17. The terminal according to claim 14, wherein, the determining, based on the one or more pieces of SA information, the one or more detection weight values corresponding to the one or more data-to-be-detected, comprises:
  determining the one or more detection weight values corresponding to the one or more data-to-be-detected based on one or more reference signal reception powers (RSRPs) of one or more demodulation reference signals (DMRSs) corresponding to the one or more pieces of SA information, wherein if a first RSRP of the one or more RSRPs of the DMRSs corresponding to the one or more pieces of SA information is larger than a second RSRP of the one or more RSRPs of the DMRSs corresponding to the one or more pieces of SA information, then a detection weight value corresponding to the first RSRP in the one or more detection weight values corresponding to the one or more data-to-be-detected is larger than a detection weight value corresponding to the second RSRP in the one or more detection weight values corresponding to the one or more data-to-be-detected.

18. The terminal according to claim 14, wherein, the determining, based on the one or more pieces of SA information, the one or more detection weight values corresponding to the one or more data-to-be-detected, comprises:
  determining the one or more detection weight values corresponding to the one or more data-to-be-detected based on one or more signal reception power values of one or more demodulation reference signals (DMRSs) corresponding to one or more the data-to-be-detected indicated by the one or more pieces of SA information, wherein if a first signal reception power value of the one or more signal reception power values of the one or more DMRSs corresponding to the one or more data-to-be-detected indicated by the one or more pieces of SA information is larger than a second signal reception power value of the one or more signal reception power values of the one or more DMRSs corresponding to the one or more data-to-be-detected indicated by the one or more pieces of SA information, then a detection weight value corresponding to the first signal reception power value in the one or more detection weight values corresponding to the one or more data-to-be-detected is larger than a detection weight value corresponding to the second signal reception power value in the one or more detection weight values corresponding to the one or more data-to-be-detected.

19. The terminal according to claim 12, wherein, detecting, based on the one or more detection weight values, the one or more data-to-be-detected within the data detection capability of the first terminal, comprises:
  filtering the one or more data-to-be-detected based on one or more the detection weight values within the data detection capability of the first terminal;
  detecting the filtered data-to-be-detected.

20. The terminal according to claim 19, wherein, filtering the one or more data-to-be-detected based on the one or more detection weight values within the data detection capability of the first terminal, comprises:
  sorting the one or more detection weight values in a descending order to obtain a detection weight value sequence;
  extracting sequentially corresponding data-to-be-detected from the detection weight value sequence;
  determining whether a cumulative detection capability required for detecting the extracted data-to-be-detected exceeds a maximum data detection capability of the first terminal or not;
  if the cumulative detection capability required for detecting the extracted data-to-be-detected does not exceed the maximum data detection capability of the first terminal, continuing to extract next data-to-be-detected from the detection weight value sequence until the cumulative detection capability required for detecting the extracted data-to-be-detected reaches the maximum data detection capability of the first terminal;
  if the cumulative detection capability required for detecting the extracted data-to-be-detected exceeds the maximum data detection capability of the first terminal, removing a datum-to-be-detected having a lowest detection weight value from the extracted data-to-be-detected, continuing to extract next data-to-be-detected from the detection weight value sequence until the cumulative detection capability required for detecting the extracted data-to-be-detected reaches the maximum data detection capability of the first terminal.

* * * * *